US008943307B2

(12) United States Patent
Solotorevsky

(10) Patent No.: US 8,943,307 B2
(45) Date of Patent: Jan. 27, 2015

(54) SYSTEM AND METHOD FOR RETAINING USERS' ANONYMITY

(71) Applicant: Cvidya Networks Ltd., Herzliya (IL)

(72) Inventor: Gad Solotorevsky, Even Yehuda (IL)

(73) Assignee: Cvidya Networks Ltd., Herzelia (IL)

( * ) Notice: Subject to any disclaimer, the term of this patent is extended or adjusted under 35 U.S.C. 154(b) by 38 days.

(21) Appl. No.: 13/741,527

(22) Filed: Jan. 15, 2013

(65) Prior Publication Data

US 2013/0138948 A1    May 30, 2013

(30) Foreign Application Priority Data

Jan. 16, 2012  (IL) .......................................... 217559

(51) Int. Cl.
*H04L 29/08* (2006.01)
*H04L 29/06* (2006.01)

(52) U.S. Cl.
CPC ............ *H04L 67/22* (2013.01); *H04L 63/0428* (2013.01)
USPC ........................................................ 713/153

(58) Field of Classification Search
CPC ...... H04L 63/0421; H04L 9/00; H04W 12/00
USPC ............................................ 713/153; 705/63
See application file for complete search history.

(56) References Cited

U.S. PATENT DOCUMENTS

| 5,153,837 | A | 10/1992 | Shafer et al. | |
|---|---|---|---|---|
| 7,561,681 | B2 | 7/2009 | Booth et al. | |
| 2002/0110227 | A1* | 8/2002 | Bedingfield et al. | 379/88.19 |
| 2003/0188171 | A1* | 10/2003 | DeCenzo et al. | 713/185 |
| 2007/0255661 | A1* | 11/2007 | Yoshida et al. | 705/74 |
| 2008/0155648 | A1* | 6/2008 | Chae et al. | 726/1 |
| 2008/0294559 | A1* | 11/2008 | Wield et al. | 705/50 |
| 2010/0144310 | A1 | 6/2010 | Bedingfield, Sr. et al. | |
| 2011/0029655 | A1 | 2/2011 | Forbes, Jr. et al. | |
| 2011/0095903 | A1 | 4/2011 | Gudlavenkatasiva et al. | |
| 2011/0177829 | A1* | 7/2011 | Platt et al. | 455/456.2 |
| 2011/0196743 | A1* | 8/2011 | Schiff et al. | 705/14.58 |
| 2014/0108258 | A1* | 4/2014 | Williams | 705/51 |

FOREIGN PATENT DOCUMENTS

WO    2012104149 A1    8/2012

OTHER PUBLICATIONS

Zheng et al., "Analysis of the Digital Home Wireless Meter Reading Interface Execution Process", 2012, IEEE, pp. 614-620.*

* cited by examiner

*Primary Examiner* — Matthew Smithers
(74) *Attorney, Agent, or Firm* — Browdy and Neimark, PLLC

(57) ABSTRACT

A method and a system are provided for generating information that relates to services being utilized by a user, by which: at a user device, retrieving usage information that relates to services consumed by the user of the user device; forwarding by the user device the retrieved usage information towards a central processing unit; at the central processing unit, determining based on the received usage information and based on at least one pre-determined criterion associated with the services being consumed by the user, whether a message should be sent to that user; and if in the affirmative, sending a message to the user that relates to the received usage information, without logging any information that relates to the message being sent to the user, at the central processing unit.

11 Claims, 2 Drawing Sheets

SYSTEM AND METHOD FOR RETAINING USERS' ANONYMITY

CROSS-REFERENCE TO RELATED APPLICATIONS

This application claims priority of Israel Patent Application No. 217559, filed Jan. 16, 2012, the disclosure of which is incorporated by reference herein in its entirety.

TECHNICAL FIELD

The present invention relates to methods and systems to enable a remote user to access data which specifically relates to that user while retaining the user anonymity, and in particularly but not exclusively, the present invention relates to methods and systems to enable the user to access data that relates to utilization of resources in order to enable verification of appropriate consumption of the utilized resources while retaining the entity privacy uncompromised.

BACKGROUND

With the ever growing number of applications that allow users to carry out operations that rely on remote retrieval of data which is associated with the users who wish to retrieve that data, one of the problems that arise relates to the identity of the users. Even though users fully understand and appreciate the need to have the data that relate to them, associate with their personal details, still, there are many occasions that the users would like to be able to access a database while retaining their anonymity, for example when they want to access data that relates to their utilization of certain resources, and particularly when they need to verify the retrieved data (e.g. verify the appropriate consumption of the utilized resources), while retaining their privacy uncompromised.

Quite a vast number of publications suggest various ways of remote data accessing by users. To name but few, U.S. Pat. No. 7,561,681 describes an interactive system for managing and remotely monitoring and affecting the connection status of a customer utility load network. The interactive system is provided through a web-based application, offering a plurality of selectable services to a user. Such services may include a read service for providing metered customer utility data, a usage and demand notification service for alarming a user when utility usage and demand exceeds a threshold amount, and a connection service for setting a utility load as either connected or disconnected. The information is then relayed from the system controller and web-based utility application to any utility meters linked to the system.

WO 2012104149 describes a utility meter for metering at least one utility consumption that comprises among others: a memory to store a personal key (K), a unique identifier (ID0), a utility consumption value (V) metered by the utility meter, and a remote management key (K0, K1). The utility messages are authenticated by using said personal key (K), and a payload key (Kp) is generated and used to encrypt the utility consumption value (V) therewith. A cryptogram (C0, C1) is formed by the payload key (Kp) encrypted by the remote management key (k0, K1), so that a utility message comprising the encrypted utility consumption value (V) and the cryptogram (C0, C1) may be sent as one or two separated utility messages being encrypted by the personal key (K).

U.S. Pat. No. 5,153,837 describes a system for generating an energy log for instant recall and display. The system is permanently programmed in read-only memory with the task of scanning sensor inputs, performing consumption calculations, updating the non-volatile memory, responding to external commands, and monitoring peripheral performance. The stored information is available for real-time query of individual sensor data or as a composite hard copy report on a month-to-date or month-end basis. The apparatus accepts inputs from analog and digital sensors whose outputs produce information related to data such as current consumption, water consumption, or fuel consumption and provides an optional interface for the control of these functions. Based on the various inputs, data is stored in specified memory locations and consumption rates and costs are computed based on sensor calibration factors and energy cost factors stored in non-volatile memory at the time of calibration. The system is programmed to detect invalid data and failed sensor inputs in addition to automatically calibrating.

U.S. 20110029655 discloses a method for control transmission of messages over a fixed bandwidth link from fixed position communication devices to a central controller in a load management system. The messages include information relating to electric power consumption by power consuming devices located at service points that include the communication devices. The central controller determines an identifier associated with each communication device, a reporting period during which the messages are to be transmitted by the communication devices and transmission increments within the reporting period. The controller allocates each transmission increment to a respective group of communication devices. The controller then determines a transmission time for a message from a particular communication device based on the identifier for the particular device, duration of a transmission increment allocated to a group of communication devices that includes the particular device, and a quantity of communication devices in the particular device's group.

However, one of the problems which arise in such environments is that a user's data privacy might be breached, if an unlawful access is gained to the information stored within a central system's device.

SUMMARY OF THE DISCLOSURE

The disclosure may be summarized by referring to the appended claims.

It is an object of the present invention to provide methods and systems for verifying the amount of services consumed, through communication devices such as Smart Phones, Tablets, Smart TVs, and personal computers.

It is another object of the present invention to provide methods and systems for reporting utilization of resources by a third party, e.g. using a smart meter for measuring and reporting consumption of utility resources such as electricity, water, gas, etc. in cases where the consumption is made through one or more different devices.

Other objects of the present invention will become apparent as the description of the invention proceeds.

According to one embodiment, there is provided a method for generating information that relates to services being consumed by a user, wherein the method comprises the steps of:

at a user device (e.g. a smart phone, a tablet, a smart TV, a personal computer, and the like), retrieving usage information that relates to services consumed by the user of the user device;

forwarding by the user device the usage information thus retrieved, towards a central processing unit (e.g. a server);

at the central processing unit, determining based on the received usage information and based on at least one pre-determined criterion, whether a message should be sent to the user (either to the same user device or to another device associated with that user); and if in the affirmative, sending to the user a message that relates to the received usage information, without logging any information that relates to the message being sent to the user at the central processing unit.

By following the above embodiment it is possible to provide a service-consumption related message to a user without compromising the user's own anonymity, as the retrieval of the information that relates to the amount of services being consumed is retrieved by the user's own device, whereas the message which, if generated, will be sent to the user but without logging any details thereof.

The term "usage information" as used herein throughout the specification and claims, should be understood as explained above to encompass information that relates to consumption of certain resources by the user. In addition, this term should be understood to optionally geographical information that relates to the location where these resources were consumed. For example, if the communication device has used Value Added Services (hereinafter: "VAS") while roaming, or if a communication device sent certain amount (say 20) SMS while being at a certain location or while being connected to a certain communication cell. Furthermore, adding the geographical information to the usage information may be triggered only in response to exceeding a certain pre-defined threshold. For example, if the communication device has consumed over a pre-defined amount of VAS services while roaming.

As will be appreciated by those skilled in the art, the determination to be made at the central processing unit whether a message should be sent to the user, should not be understood as being limited to sending a message that relates in one way or another to a problematic consumption of resources, but also encompass all types of applicable messages generated in response to the usage information received and the at least one pre-determined criterion. For example, upon analyzing the usage information by the central processing unit it has been found that the information meets a pre-defined criterion which is based upon which are the resources consumed by the user. In this case, if based on the information received it has been found that the user has used the resources as defined in the pre-defined criterion, the message to be sent for the user may comprise for example certain offer or advertising, such as an offer to contract a certain communication bundle based the specific resources consumptions reported by the user device in the usage information sent to the central processing unit.

According to another embodiment the method provided further comprises a step of storing the received usage information.

According to still another embodiment, the message comprises an indication that relates to the amount of services consumed by the user. For example, the message may comprise an indication that serves as an alert in case the user is about to reach or has reached the maximum amount of services that had been allocated to him/her.

In accordance with another embodiment, the message is generated based on history information derived either from the user device or from any other device, and wherein the history information is associated with amount of services that had been consumed by that user.

By yet another embodiment, the method provided further comprising a step of sending a confirmation message by the user in response to the message received. This embodiment provides therefore among others means to minimize the number of events of inappropriate consumption of services by others than the user himself/herself, as the user confirms the message being sent to him/her.

The term "appropriate consumption of services" which may serve as one pre-defined criterion, as used herein, should be understood to encompass among others, the consumption of services according to predefined policies, e.g. a policy whereby if a user sends more than 10 SMSs per day he/she will be notified, or a policy by which the user is notified if the way that the user device is used does not correspond to a previous pattern by which that device was used.

As an example, the system and method provided by the present invention are such that allow detecting an inappropriate consumption of services by a device which was used in the past say for utilizing only SMS services (e.g. transmission and reception only of SMSs), and is now being used for consuming extensive voice services. As another example, the system and method provided by the present invention are such that allow detecting an inappropriate consumption of services where there is a deviation from a usage pattern characterizing a group of devices, to which the device is associated, e.g. when a communication device that belongs to an enterprise, starts consuming substantially more VAS (e.g. 100 times over) than the average consumption of these services by other devices belonging to the same enterprise. Another example of an appropriate consumption that may be dealt with by using the method and system provided by the present invention is where a communication device consumes services that are tagged as "problematic service", e.g. a device that sends an SMS to numbers included in a hot list as being involved in past fraudulent activities.

According to another embodiment, at least one criterion of appropriate consumption of services is defined for a given user device, or for a group of user devices. Such at least one criterion for appropriate consumption of services may be defined by different entities, including but not limited to the owner of the communication device, an application installed at the communication device, by a third party, e.g., an enterprise to which the owner of the communication devices belongs, the operator of the communication network at which the device is operative, the service provider, and the like.

In accordance with another embodiment, the at least one criterion is at least partially based upon information received from the user of the communication device. By this embodiment, the owners of devices contribute to create rules and sets of information that may be used later on as the at least one pre-defined criterion in order to define inappropriate usage of the devices. For example, when a user detects a call to a VAS that he/she has not consumed (or at least did not knowingly consume), the user sends a notification to a server (e.g. the network operator's server) indicating the detection made. The notification may then be used for example to create a hot list of suspected VAS numbers.

According to another embodiment, the step of determining whether a message should be sent to the user is based upon analyzing notifications provided by a plurality of user devices associated with a single user, wherein a single user may be an individual user, an organization, etc., in order to establish overall services consumed by that single user.

By yet another embodiment, the central processing unit is configured to analyze a plurality of notifications received from one or more respective users and to assign a weight to risks associated with VAS numbers that relate to this plurality of notifications.

According to still another embodiment the user device may be operative in one or more of the following communication networks: LTE, Wi-Fi, WiMax, GSM 2G, GSM 3G, public switched telephone network (PSTN), and the like.

In accordance with another embodiment the services for which the appropriate/inappropriate consumption is determined, are: voice services, SMS, Premium Rate SMS, MMS, Data, streaming, value add services (VAS), VoIP, content consumption, e.g. movies, songs, or ringtones, downloading content, applications purchasing and downloading, gaming, and the like.

By another embodiment, the method comprises the steps of:

providing the user device with a unique ID and a unique private decryption key;

storing at the central processing unit a combination that comprises the unique ID and a public encryption key associated therewith, and details to enable communicating with the user's device;

upon receiving usage information from the user device, processing the newly received usage information;

following the processing the new information, generating one or more messages for forwarding same towards the specific user device, and encrypting the one or more messages by using the public encryption key associated with the ID of said user's device;

broadcasting the one or more encrypted messages to a plurality of users' devices associated with the central processing unit; and retrieving the content of the one or more encrypted messages by the user device provided with the appropriate unique private decryption key, for which the one or more messages were generated.

According to another aspect there is provided a system for generating information that relates to services being utilized by a user, wherein the system comprising:

a plurality of user devices (e.g. smart phones, tablets, smart TVs, personal computers, and the like, or any combination thereof and the like), operative to retrieve usage information that relates to services consumed by the user of the user device, wherein each of the plurality of user devices is provide with a communication device adapted to forward the usage information thus retrieved, towards a central processing unit;

a central processing unit (e.g. a server) comprising a processor operative to determine based on the received usage information and based on at least one pre-determined criterion, whether a message should be generated for sending same to one or more of the users of the plurality of user devices (either to the same user devices that had forwarded the retrieved usage information or to another device associated with the respective users of the devices which had forwarded the retrieved usage information); and if in the affirmative, the processor is operative to generate one or more messages for the one or more respective users, wherein each of the one or more messages relates to the received usage information associated with a respective user that would receive that message, without logging any information that relates to the message being sent to that user.

According to another embodiment the central processing unit further comprises a storage operative for storing the received usage information.

According to still another embodiment, each of the one or more messages comprises an indication that relates to the amount of services consumed by the respective user.

In accordance with another embodiment, the message is generated based on history information derived either from the user device or from any other device, wherein the history information is associated with amount of services that had been consumed by that user.

By yet another embodiment, each of the plurality of user devices is further operative to send a confirmation message toward the central processing unit in response to the message received.

According to another embodiment, at least one criterion of appropriate consumption of services is defined for a given user device, or for a group of user devices. Such at least one criterion for appropriate consumption of services may be defined by different entities, including but not limited to the owner of the communication device, an application installed at the communication device, by a third party, e.g., and enterprise to which the owner of the communication devices belongs, the operator of the communication network at which the device is operative, the service provider, and the like.

According to another embodiment, the processor of the central processing unit analyzes one or more notifications provided by one or more user devices and associated with a single user (e.g. that single user may be an individual user, an organization, etc.) in order to establish overall amount of services consumed by that single user.

By yet another embodiment, the central processing unit is further configured to analyze a plurality of notifications received from one or more respective users and to assign a weight to risks associated with VAS numbers that relate to this plurality of notifications.

In accordance with another embodiment, the processor of the central processing unit is further operative to generate a set comprising a unique ID and a unique private decryption key to be provided to each of the plurality of user devices and wherein the central processing unit further comprising a storage for storing a combination that comprises the unique ID and a public encryption key associated therewith, and details to enable communicating with the user's device;

wherein upon receiving new usage information from each of the plurality of user devices, the processor is adapted to process the received usage information and to generate one or more messages for forwarding same towards the specific user device from which new usage information has been received, to encrypt the one or more messages by using the public encryption key associated with the ID of said user's device and to enable broadcasting of the one or more encrypted messages to the plurality of user devices;

and wherein the user device that sent the new usage information is operative to retrieve the content of the one or more encrypted messages by using its unique private decryption key.

BRIEF DESCRIPTION OF THE DRAWINGS

For a more complete understanding of the present invention, reference is now made to the following detailed description taken in conjunction with the accompanying drawings wherein.

DETAILED DESCRIPTION

Figure 1:
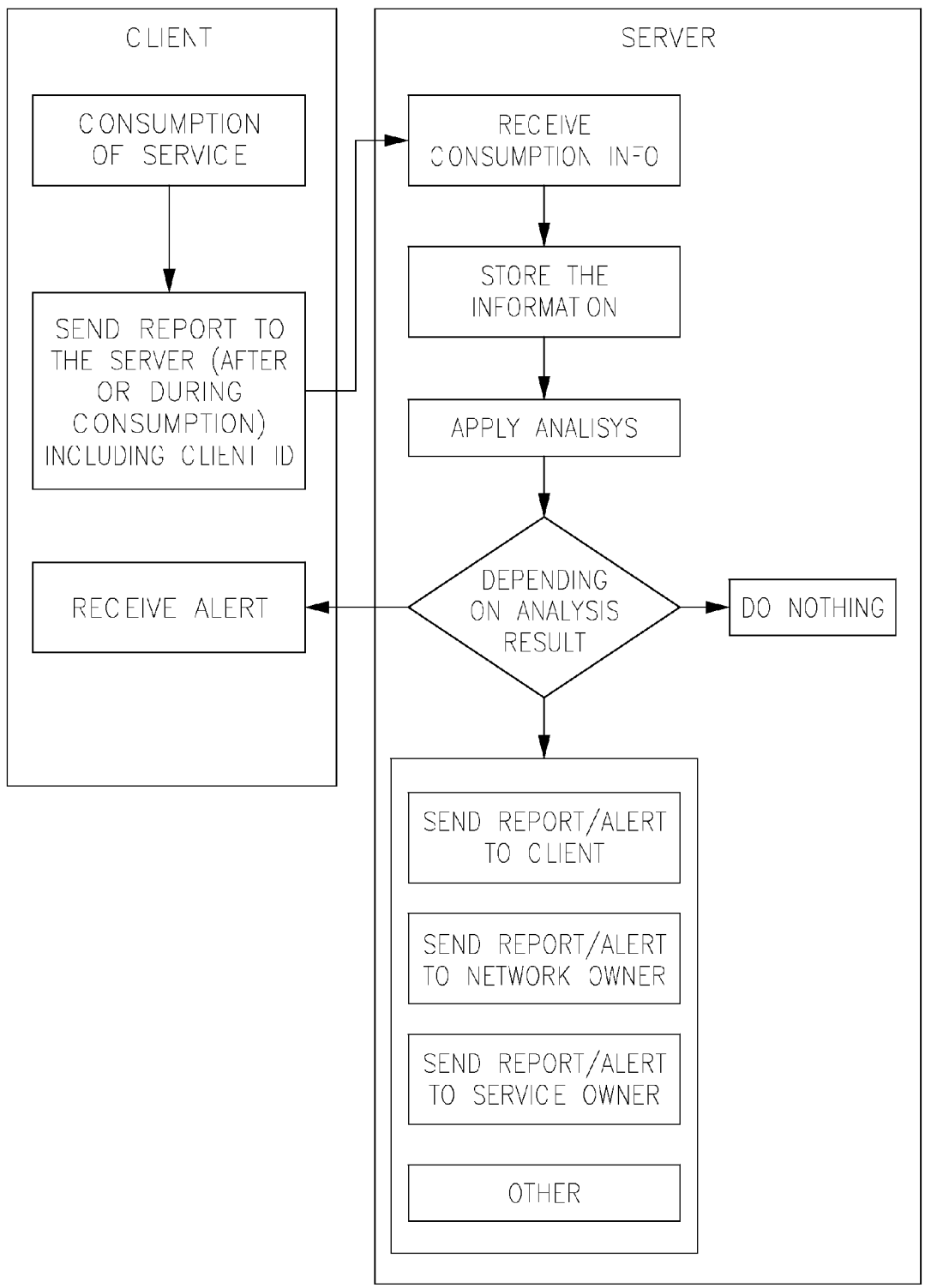
FIG. 1 presents a flow chart illustrating an example of carrying out an embodiment of the present invention.

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a thorough understanding of the present invention. It should be apparent, however, that the present invention may be practiced without these specific details.

Following are some illustrative examples that are not intended in any way to restrict the scope of the invention, but rather to ease the reader's understanding of the disclosure.

Typically, consumption of services e.g. as referred to hereinabove, bears a financial impact. The financial impact may be of different forms, including but not limited to direct payment by the owner of the user device made to the provider of the services consumed, payment by the owner of the user device to a third party that invoices on behalf of provider of the consumed services, etc. In other cases there is no direct payment, but a reduction from a pre-defined allowance is made, e.g., if the owner of the user device had pre-paid for a bundle of services, e.g. 10 movies, so that each time a movie is consumed, the allowance is reduced by one. In some cases, the financial impact involves only a third party, the provider of the consumed services, e.g., when the owner of the user device watches a free movie, an in return watches some advertisements incorporated therein. By this business model the advertiser pays the provider of the consumed service (i.e. the movies' provider).

In case of services being consumed while using the user's device, ideally, the owner of the user device is aware of the services that were consumed while using his/her device, and preferably, also of the financial impact of the consumption of these services. Unfortunately, this is not always the case, as the owner of the user device is not always aware of the services being consumed and of their financial impact. For example, the owner of a user device such as a telephone sends an SMS, but is not aware that it is a Premium Rate SMS. Another example is an application that had been installed at the user device and carries out an activity of which the owner of the communication device is unaware, such as downloading large amounts of data. Another example is an application that had been installed at the user device, and is intentionally consuming a service while concealing its use from the user in order to boost the consumption and thereby the financial adverse impact upon the user who would have to pay the charge for the consumed services.

A system according to an embodiment of the present invention comprises a server, a plurality of user devices each comprising a client application, and optionally one or more managing applications. The server may be a single server or a plurality of servers acting as a distributed server. The client application resides at each of the plurality of user devices. The optional one or more managing applications may reside at the server or at the client applications, involve any combination thereof, or even it may reside in other devices, as long as each such managing application is able to communicate with the server.

According to an embodiment of the invention, each of the client applications sends to the server information that relates to the services that had been consumed by the respective communication device e.g. telephone calls (number dialed, duration, start time, etc.). The information may include also indication about the application residing at the communication device that consumed the service (resource). The client application may also send additional information about the application, e.g. for how long has it been operating, what is the memory size occupied by the application, how much battery power has been utilized by operating that application, etc.

The server receives the consumption related information (usage information) from the user devices, and analyzes the received information. The analysis may be done by any one or more of methods including but not limited to comparing the information with pre-defined thresholds, comparing the information with historical behavior of the user device sending the information, comparing the information with historical behavior of other communication devices (which may be information that had been received from a group of communication devices or from a sub-group thereof, e.g. by dividing the group into specific segments), comparing the information with service providers' hotlists (e.g., lists of VAS phone numbers, lists of Premium SMS numbers, lists of Premium SMS numbers suspected to be involved in fraudulent activities), data mining, statistical analysis, decision trees, etc.

A managing application preferably defines the analysis which the server should carry out, and which of the pre-defined rules and thresholds should be applied by the central processing unit for a given user device. Different managing applications (or users of the managing applications) may have different permissions to set policies. For example, a managing application may be able to set thresholds to existing rules or a specific user device, while another managing application may determine completely new rules for a group of user devices.

As a result of the analysis of the information sent by a communication (user) device, the central processing unit (server) may take one or more actions, including but not limited to, the following actions:

Provide information to the owner of the communication device that relates to the service consumed;

Provide an alert to the owner of the communication device on the service consumed, either in response to changes in the pattern of consumption, or when the consumption exceeds certain pre-defined thresholds, or when expensive services are consumed (e.g. download of data while roaming; sending premium rate SMSs; calling or browsing or sending SMSs to destinations suspected to be engaged in fraudulent activities);

Provide an alert to the provider of the consumed service in response to changes in the pattern of consumption, or when the consumption exceeds certain thresholds;

Provide an alert to the network operator, in response to changes in the pattern of consumption, or when the consumption exceeds certain thresholds.

Stop the consumption of the service by sending an appropriate message to the user (communication) device;

Stop the consumption of the service by sending an appropriate message to the service provider;

Stop the consumption of the service by sending appropriate orders to the network operator; and Update rules, parameters, thresholds, hot lists, and the like, that are used by the server for future analysis of appropriate/inappropriate service consumption by communication devices.

The owner of the user device may use the client application to send information regarding suspicious service consumption. For example, if the client application receives an alert sent by the server that a VAS number was called by this device, the owner of the device may send back a message indicating that this number is suspicious since the call was made without the device's owner knowledge. The owner may send this indication either in response to a message sent by the central processing unit or he/she may initiate sending this message by himself/herself.

The server may use the information (e.g. reports) about suspicious service consumption to update its analysis methods including but not limited to updating threshold, rules, data mining models, statistical analysis models, white and hot lists. It should be noted that a number of methods are known per se in the art to scoring the validity and importance of reports, e.g. by giving a high score to a report when many users had sent the same report, and giving a low score if the same service has been consumed by many user devices but only a small number of them had reported that service as being a suspicious one. As will be appreciated by those skilled in the art, the present invention is not limited to the scoring method applied.

By an embodiment of the present invention, a group of communication devices is associated with an enterprise or any other similar entity, and the enterprise uses managing applications to establish the acceptable resource consumption for each of the associated communication devices. The enterprise may also receive reports and alarms regarding the behavior of each of the devices.

EXAMPLES

Privacy is a typical concern in situations where an application that resides at a communication device sends consumption related information to a central server. Typically, owners of communication devices will be very caution in adopting any solution where their privacy might be compromised. In many situations, a communication device needs to send to a server private information, and receives back a result of an analysis which is based not just on the recent piece of information, but also on previous information sent on previous occasions by the same communication device (e.g. this may be particularly useful in the field of health care when a monitor sends information to a server, but the patient wishes to remain anonymous).

The method provided by an embodiment of the present invention suggests a solution to such a need. When a user's device (e.g. via a client application) sends information to the server, it sends it with an ID. The server keeps an association of this ID with an encryption public key that is unique to the communication device connected to the server, but the server does not keep any information that associates this ID with a specific communication device that had sent the information. Whenever the server should send a message to a specific client (i.e. a specific communication device) it encrypts the message by using a public key associated with the communication device and will then broadcast the message to all the communication devices associated with that server. Since only the communication device with the specific ID has the specific private key to decipher the message, only this very same communication device will be able to receive its content. Furthermore, in case there is a plurality of communication devices connected to one server, the devices may be grouped in a way that each ID belongs to one segment (e.g. a segment of 1000 devices), and each time the server sends a notification, it would be sent only to the devices included in that segment rather than to all communication devices connected to this server. The information sent by the communication device to the server typically includes data, but may also comprise information on how to process the data sent, e.g. the information may also include a rule defining "send an alarm if . . . ".

FIG. 1 presents a flow chart illustrating an example of carrying out an embodiment of the present invention.

Figure 2:
FIG. 2 illustrates a client application subscribing to a service provided by the central processing unit.

FIG. 2 illustrates a client application subscribing to a service provided by the server. In return, the Client receives a unique ID and a unique private decryption key. The server stores the combination (pair) of the ID and its associated public encryption key, and also the details to enable communicating with the Client (e.g., a phone number, or an IP address), but it is kept separately from that ID. Assuming that there is a plurality of Client applications connected to the server (which is the typical case), then the server is unable to associate a particular ID to any particular details for communicating with the Client. Furthermore, the IDs, the encryption keys, and the communication details are located in the server's storage (e.g. their location in a data structure like an array) where they can be assigned randomly.

Figure 3:
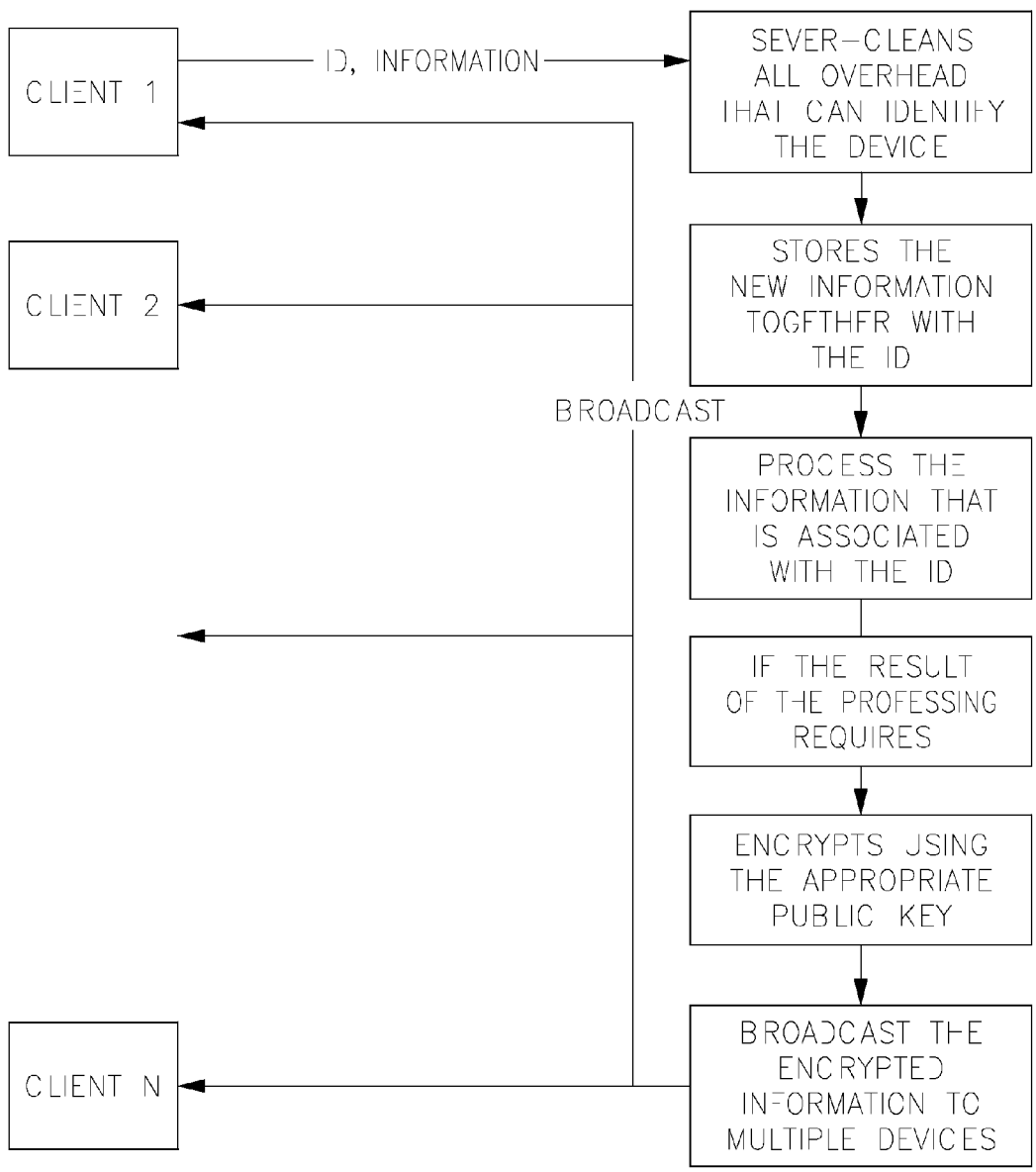
FIG. 3 demonstrates an embodiment where a client application installed at a user device sends the device ID and some core information to the server.

In FIG. 3 Client1 sends its ID and some core information to the server. Although the management of the communication network used, might add additional information that can identify the sender (e.g., sending phone number or IP address) while forwarding this information, still, the server deletes all the additional identification information, and does not store it in any place. The server does store the core information it received, and keeps it associated with the ID. The server then processes the information using the new information that has just been received, and also old information associated with that very same ID. The results of the processing may be stored as additional information associated with the specific ID. If the outcome of the processing requires sending back some information/indication then this information/indication is encrypted using the public encryption key associated with the specific ID, and is broadcasted to all the Clients registered with the system. Only the Client with the appropriate private decryption key will be able to decipher the message. In addition, according to another embodiment, the Client is made aware if the broadcasted message has been properly deciphered thereat, by using any method known in the art per se, such as by using a checksum on the deciphered message.

Let us consider another example where a plurality of communication devices send information to a server indicating the number of SMSs that were sent by each of these devices (e.g. on a daily basis). The server analyses the information received from each device, and responds by sending a message to each device which had exceeded a pre-defined number of premium rate SMSs within the last 7 days. Once the message has been sent, no indication that relates to the communication device that received the message is kept in the server, thereby retaining the privacy of the entity that had received the message.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method for generating information that relates to services being utilized by a user, wherein the method comprises the steps of:

at a user device, retrieving usage information that relates to services consumed by the user of said user device;

forwarding by the user device the usage information thus retrieved, towards a central processing unit;

at the central processing unit, determining based on the received usage information and based on at least one pre-determined criterion associated with the services consumed by the user of the user device, whether a message should be sent to said user; and if in the affirmative, sending a message to the user that relates to the received usage information, without logging any information that relates to the message being sent to the user, at said central processing unit;

wherein the message is generated based on history information derived either from the user device or from any other device, and wherein the history information is associated with amount of services that had been consumed by said user.

2. The method of claim 1, wherein the message comprises an indication that relates to the amount of services consumed by the user.

3. The method of claim 1, further comprising a step of sending a confirmation message by the user in response to the message received.

4. The method of claim 1, wherein the at least one criterion associated with the consumption of services is defined for a given user device, or for a group of user devices.

5. The method of claim 4, wherein the at least one criterion is at least partially based upon information received from the user of the user device.

6. A method for generating information that relates to services being utilized by a user, wherein the method comprises the steps of: at a user device, retrieving usage information that relates to services consumed by the user of said user device; forwarding by the user device the usage information thus retrieved, towards a central processing unit; at the central processing unit, determining based on the received usage information and based on at least one pre-determined criterion associated with the services consumed by the user of the user device, whether a message should be sent to said user; and if in the affirmative, sending a message to the user that relates to the received usage information, without logging any information that relates to the message being sent to the user, at said central processing unit, wherein the step of determining whether a message should be sent to the user is based upon analyzing notifications provided by a plurality of user devices associated with a single user.

7. A method for generating information that relates to services being utilized by a user, wherein the method comprises the steps of: at a user device, retrieving usage information that relates to services consumed by the user of said user device; forwarding by the user device the usage information thus retrieved, towards a central processing unit; at the central processing unit, determining based on the received usage information and based on at least one pre-determined criterion associated with the services consumed by the user of the user device, whether a message should be sent to said user; and if in the affirmative, sending a message to the user that relates to the received usage information, without logging any information that relates to the message being sent to the user, at said central processing unit, wherein the step of determining whether a message should be sent to the user further comprises analyzing a plurality of notifications received from one or more respective users and assigning a weight to risks associated with value add services that relate to this plurality of notifications.

8. A method for generating information that relates to services being utilized by a user, wherein the method comprises the steps of: at a user device, retrieving usage information that relates to services consumed by the user of said user device; forwarding by the user device the usage information thus retrieved, towards a central processing unit; at the central processing unit, determining based on the received usage information and based on at least one pre-determined criterion associated with the services consumed by the user of the user device, whether a message should be sent to said user; and if in the affirmative, sending a message to the user that relates to the received usage information, without logging any information that relates to the message being sent to the user, at said central processing unit, wherein said method further comprising the steps of:

providing the user device with a unique ID and a unique private decryption key;

storing at the central processing unit a combination that comprises the unique ID and a public encryption key associated therewith, and details to enable communicating with the user's device;

upon receiving usage information from the user's device, processing the newly received usage information;

following the processing the new information, generating one or more messages for forwarding same towards the specific user device, and encrypting the one or more messages by using the public encryption key associated with the ID of said user's device;

broadcasting the one or more encrypted messages to a plurality of users' devices associated with the central processing unit; and retrieving the content of the one or more encrypted messages by the user device provided with the appropriate unique private decryption key, for which the one or more messages were generated.

9. A system for generating information that relates to services being utilized by a user, wherein the system comprising:

a plurality of user devices operative to retrieve usage information that relates to services consumed by the user of the user device, wherein each of the plurality of user devices is provide with a communication device adapted to forward the usage information thus retrieved, towards a central processing unit;

a central processing unit comprising a processor operative to determine based on the received usage information and based on at least one pre-determined criterion, whether a message should be generated for sending same to one or more of the users of the plurality of user devices; and if in the affirmative, the processor is operative to generate one or more messages for the one or more respective users, wherein each of the one or more messages relates to the received usage information associated with a respective user that would receive that message, without logging any information that relates to the message being sent to that user, wherein said processor is further operative to generate a set of a unique ID and a unique private decryption key to be provided to each of the plurality of user devices and wherein said central processing unit further comprising a storage for storing a combination that comprises the unique ID and a public encryption key associated therewith, and details to enable communicating with the user's device;

wherein upon receiving new usage information from each of the plurality of user devices, said processor is adapted to process the received usage information and to generate one or more messages for forwarding same towards the specific user device from which new usage information has been received, to encrypt the one or more messages by using the public encryption key associated with the ID of said user's device and to enable broadcasting of the one or more encrypted messages to the plurality of user devices; and wherein the user device that sent the new usage information is operative to retrieve the content of the one or more encrypted messages by using its unique private decryption key.

10. The system of claim 9, wherein each of the one or more messages comprises an indication that relates to the amount of services consumed by the respective user.

11. The system of claim 9, wherein each of the plurality of user devices comprises operative to send a confirmation message towards the central processing unit in response to the message received by a respective user device.

\* \* \* \* \*